United States Patent
Senese et al.

(10) Patent No.: US 8,650,404 B2
(45) Date of Patent: Feb. 11, 2014

(54) COMMUNICATION PROTOCOL FOR SECURE COMMUNICATIONS SYSTEMS

(75) Inventors: Thomas J. Senese, Schaumburg, IL (US); Helen Y. Hoselton, Arlington Heights, IL (US); Obaid Shahab, Lombard, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 0 days.

(21) Appl. No.: 13/406,610

(22) Filed: Feb. 28, 2012

(65) Prior Publication Data

US 2013/0227294 A1  Aug. 29, 2013

(51) Int. Cl.
*H04L 29/00* (2006.01)

(52) U.S. Cl.
USPC .................... 713/176; 713/169; 380/278

(58) Field of Classification Search
USPC .......................... 713/169; 380/278
See application file for complete search history.

(56) References Cited

U.S. PATENT DOCUMENTS

2011/0026714 A1* 2/2011 Thomas et al. ............... 380/278

OTHER PUBLICATIONS

Tetra MoU; Security and Fraud Prevention Group (SFPG) Recommendation 02, Edition 4; End-To-End Encryption; Jan. 27, 2005; 141 Pages.
PCT International Search Report Dated May 6, 2013 for Counterpart Application PCT/US2013/024412.
Kaufman Microsoft P Hoffman VPN Consortium Y Nir Check Point P Eronen Nokia C:, "Internet Key Exchange Protocol: IKEv2; draft-ietf-ipsecme-ikev2bis-10.txt", Internet Engineering Task Force, IETF; Standardworkingdraft, Internet Society (ISOC)4, Rue Des Falaises CH-1205 Geneva, Switzerland, No. 10, Apr. 15, 2010; pp. 1-90, XP015067392.
"Method for Authenticating Project 25 Otar Key Management Messages With Public Key Signature", IP.Com Journal, IP.Com Inc., West Henrietta, NY; Mar. 27, 2010, XP013137580, ISSN:1533-000.

* cited by examiner

*Primary Examiner* — Jeffrey Pwu
*Assistant Examiner* — Michael D Anderson
(74) *Attorney, Agent, or Firm* — Kenneth A. Haas

(57) ABSTRACT

A method and apparatus for authenticating a key management message within a secure communication system is provided herein. During operation, a digital signature for message authentication of a Project 25 Key Management Message (KMM) is utilized. In particular, the digital signature will be used to authenticate the KMM in scenarios where there is no Message Authentication Code (MAC). The MAC will be utilized to authenticate the KMM when available. Because authentication of KMMs take place, even when no MAC is available, it becomes increasingly more difficult to tamper or spoof the delivery of encryption keys.

16 Claims, 5 Drawing Sheets

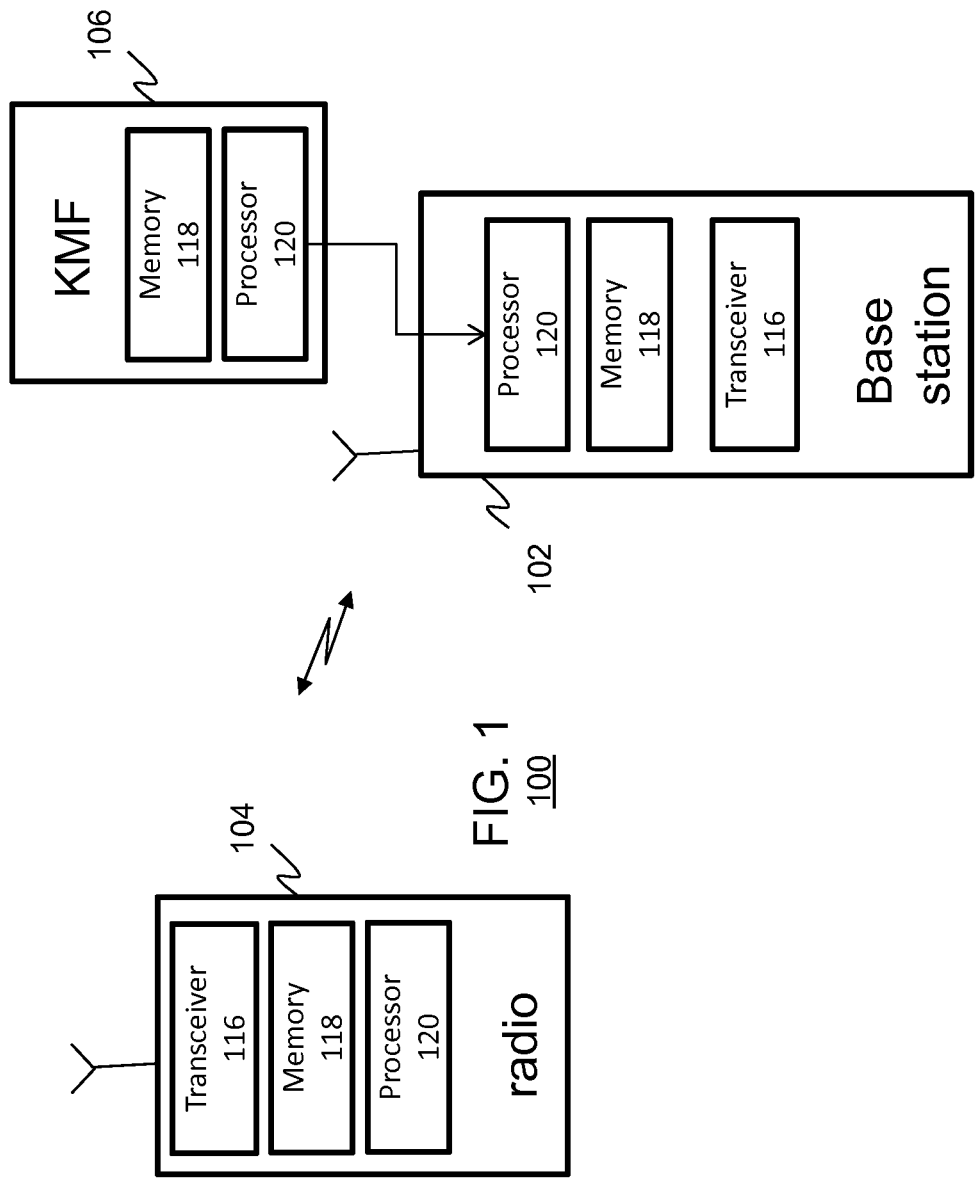

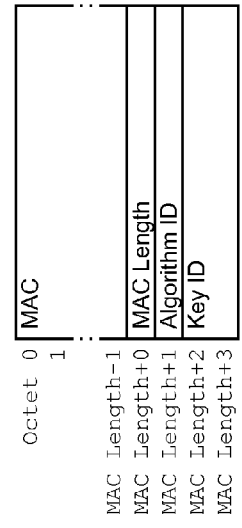
Figure 3: MAC Message Structure
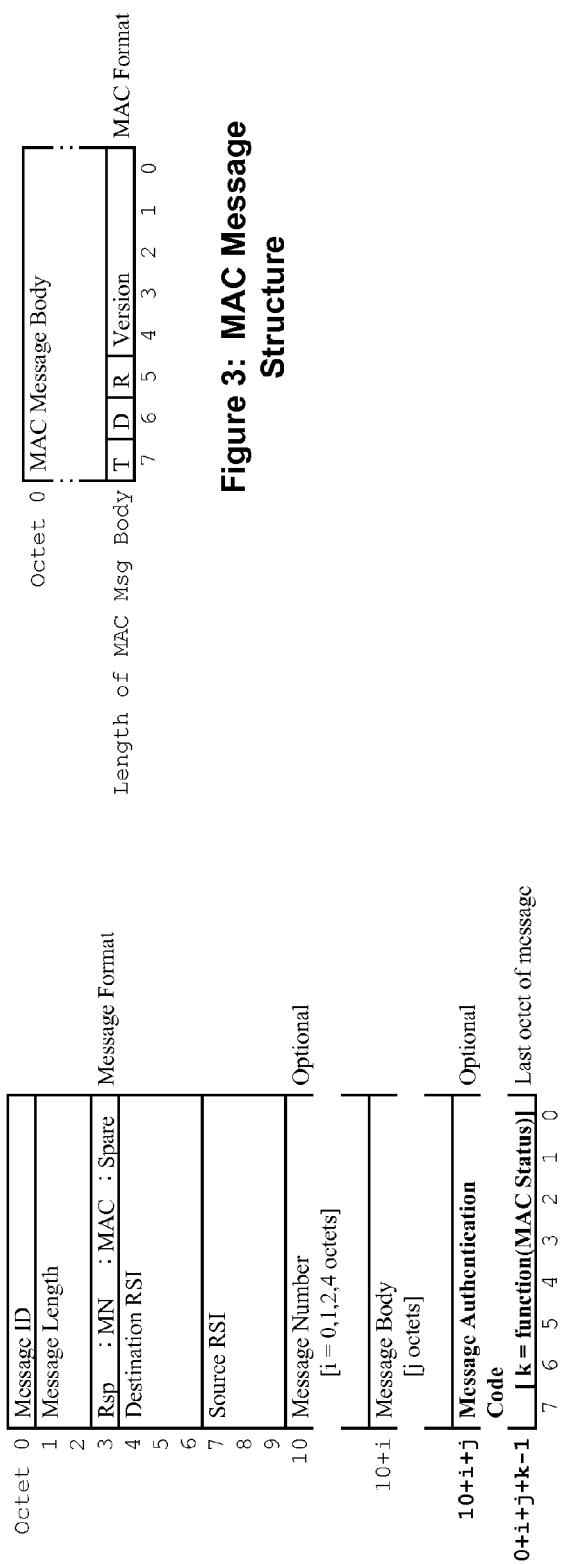
Figure 2: P25 KMM Structure
Figure 4: MAC Message Body Format

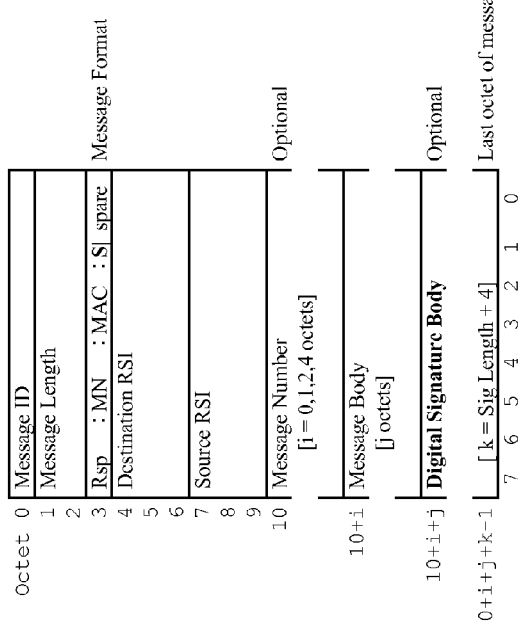
Figure 5: P25 KMM Structure with Digital Signature
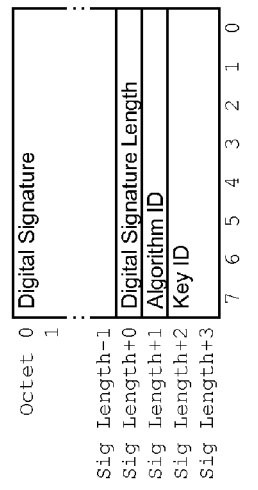
Figure 6: Digital Signature Message Body Format

US 8,650,404 B2

COMMUNICATION PROTOCOL FOR SECURE COMMUNICATIONS SYSTEMS

FIELD OF THE INVENTION

The present invention generally relates to secure communication systems, and more particularly to a method and apparatus for authenticating a key management message within such secure communication systems.

BACKGROUND OF THE INVENTION

Secure communication systems are well known. Police and public safety personnel, for example, often require secure voice and/or data communications between mobile transmitters and receivers. Such transmitters and receivers include in-car mobile or hand-held portable radios (mobiles) as well as fixed transmitters and receivers, such as a central dispatch station. The communication paths between the mobiles and the fixed end are typically wireless links, such as radio frequency (RF) channels.

Secure communication is made possible by designated transmitters and receivers ("encryption devices") sharing a traffic encryption key (TEK) that uniquely specifies an encryption algorithm for the communication. Encryption of communications takes place by encrypting all transmissions with the TEK, and having a receiver utilize the TEK to decrypt the received transmissions. Only encryption devices having identical TEKs are capable of intelligibly reproducing the communication. Each individual encryption device may have more than one TEK. For example, it is frequently desirable for supervisory radios to have several different TEKs to communicate with different groups of users each having a different TEK. The TEKs are usually changed periodically, typically weekly or monthly to reduce the likelihood that the keys might be obtained by unauthorized parties.

The process of loading TEKs into the encryption devices, called rekeying, can be accomplished in a variety of ways. Over-The-Air Rekeying (OTAR) is the act of transmitting the TEKs from a centralized Key Management Facility (KMF), over a typical encrypted communication channel to one or more target encryption devices. In some instances, a Key Encryption Key (KEK) is used to encrypt the TEK. Manual rekeying is the act of physically making contact between a key delivery device (e.g., Key Variable Loader, or KVL) and a target encryption device in order to deliver one or more TEKs to the device. A third method, Store and Forward rekeying provides for storing key management messages along with a record of target encryption devices in a key delivery device (e.g., KVL). The key management messages and associated record may be constructed at a centralized KMF and then communicated to the KVL. Then, upon connection of the KVL to the respective targets, the appropriate key management messages are forwarded (communicated) to the appropriate target devices.

In systems employing an APCO Project 25 protocol, Key Management Messages (KMMs) are used to conduct key management operations, including key transfer, between a KMF or KVL and subscriber radio. Message integrity and source authentication of the KMMs is provided by a Message Authentication Code (MAC). The requirements and protocol definitions for using the KMM MAC can be found in TIA 102.AACA-1, section 5.4.

The Project 25 KMM is used to support key management operations for symmetric keys, which include Traffic Encryption Keys (TEKs) and Key Encryption Keys (KEKs). The MAC is also a symmetric key. It is either a dedicated key that is shared between the KMF and subscriber radio, or it is derived from one of the radio's TEKs using a well known algorithm.

There are some conditions where the subscriber radio may not currently have any TEKs or MAC, but needs to conduct key management operations with the KMF in order to obtain a TEK. One scenario is where the radio user plans to give the radio to another user, or to a service shop. A common procedure is to manually erase the current TEKs in the radio before handing it over to the other user or service shop. When the owner gets the radio back, he or she may initiate a rekey request with a KMF/KVL in order to get new TEKs. Since no MAC is present on the radio, the rekey request is transmitted without MAC authentication. As a result, the KMF/KVL can not verify the authenticity of the received rekey request. Without MAC protection, these KMMs are susceptible to tampering or spoofing. Therefore a need exists for a method and apparatus for authenticating a key management message within secure communication systems that reduces the possibility of tampering or spoofing the delivery of encryption keys.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 1 is a block diagram of a communication system.

FIG. 2 shows a P25 KMM structure.

FIG. 3 shows a MAC message structure.

FIG. 4 shows a MAC message body format.

FIG. 5 shows a P25 KMM structure comprising a digital signature.

FIG. 6 shows a digital signature message body format.

Figure 7:
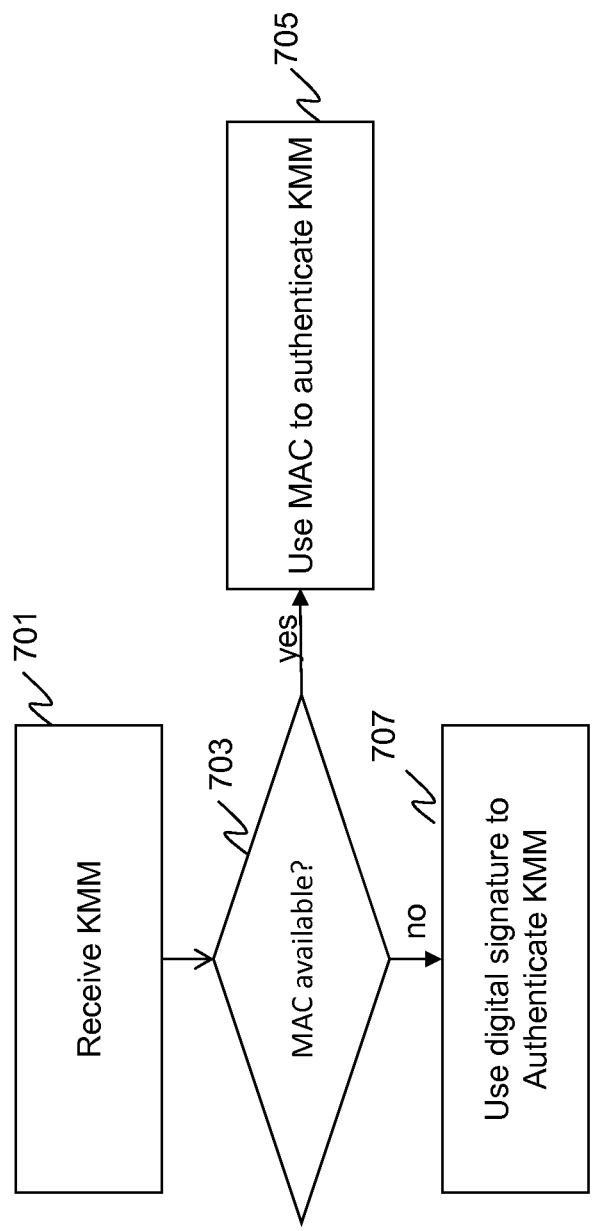
FIG. 7 is a flow chart showing operation of a receiving device that receives a KMM and authenticates the KMM.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for authenticating a key management message within a secure communication system is provided herein. During operation, a digital signature for message authentication of a Project 25 KMM is utilized. The digital signature will be used to authenticate the KMM in scenarios where there is no available Message Authentication Code (MAC). A MAC will be utilized to authenticate the KMM when available. Because authentication of KMMs take place, even when no MAC is available, it becomes increasingly more difficult to tamper or spoof the delivery of encryption keys.

Turing now to the drawings, wherein like numerals designate like components, FIG. 1 shows a block diagram of communication system 100 in accordance with an illustrative embodiment. Communication system 100 is depicted in a generalized manner. For example, system 100 is illustrated as comprising a single infrastructure device 102 (e.g., a base station (BS)), a wireless communication device 104 (e.g., a radio, user equipment (UE), and KMF 106. However, the teachings herein can be implemented in a system having additional infrastructure communication devices, wireless communication devices, and KMFs.

Each infrastructure communication device 102 and wireless communication device 104 is at least equipped with a transceiver (i.e., transmitter and receiver apparatus) 116. In addition, communication device 104, infrastructure device 102, and KMF 106 are each equipped with memory 118, and processing device 120, and is further equipped with any additional components as needed for a practical embodiment.

Processing devices 120 preferably comprise logic circuitry such as a digital signal processor (DSP), general purpose microprocessor, a programmable logic device, or application specific integrated circuit (ASIC) and is utilized to control their respective devices. Memory 118 preferably comprises standard random access memory and is used to store information related to TEKs, KEKs, digital signatures, public keys, and MACs.

The transceivers, memories, and processing devices can have any suitable physical implementation and are topologically coupled depending on the particular device implementation. These components are further operatively coupled and can be adapted, arranged, configured, and designed to perform methods in accordance with the teachings herein, for example, as illustratively described by reference to the remaining figures. Transceivers, memories, and processing devices are at least configured for applications (computer readable instructions) to exist on memory that are executed by processing devices which support key management messaging as described below.

As referred to herein, wireless communication device 104 includes, but is not limited to, devices commonly referred to as access terminals, mobile radios, mobile stations, subscriber units, user equipment (UE), mobile devices, or any other device capable of operating in a wireless environment. Examples of wireless communication devices include, but are not limited to, two-way radios, mobile phones, cellular phones, smart phones, tablets, Personal Digital Assistants (PDAs), mobile data terminals (MDT), laptops and two-way pagers.

As used herein, an infrastructure communication device 102 is a device that is a part of a fixed network infrastructure and can receive information (e.g., control data, voice (audio), video, etc.) via wireless signals from one or more wireless communication devices and transmit information via wireless signals to one or more wireless communication devices via a wireless connection. Infrastructure communication device 102 includes, but is not limited to, equipment commonly referred to as repeaters, base radios, base stations (BS), evolved Node Bs (eNB), base transceiver stations, access points, or any other type of infrastructure equipment interfacing with one or more wireless communication devices. Infrastructure communication device 102 schedules and proxies transmissions of data streams between wireless communication devices and/or KMF 106.

In this illustrative embodiment, system 100 is a broadband wireless data system, and infrastructure communication device 102 and wireless communication device 104, communicate in accordance with any standard or proprietary wireless communication protocol that allows for communication of data, including, but not limited to, APCO 25, IEEE 802.11, IEEE 802.16, Long Term Evolution (LTE), Universal Mobile Telecommunication System (UMTS), Evolved-Data Optimized (EVDO), or other communication network technologies. Infrastructure communication device 102 is hereinafter referred to as a base station (BS), and wireless communication device 104 is hereinafter referred to as a radio.

A typical communication session comprises transmission of data streams from base station 102 to the radio 104 (downlink) and from the radio 104 to base station 102 (uplink). Radio 104 in system 100 communicates with BS 102 via wireless connections. A wireless connection, as used herein, is a wireless communication channel between one BS and at least one radio, comprising an allocation of wireless connection resources in the downlink, uplink, or both directions, and can be initiated by either a base station or a radio. The wireless connections comprise allocations of radio spectrum. An allocation of radio spectrum is shared between one or more operating radios by partitioning it using multiple access techniques well known in the art. Examples of such techniques include Code Division Multiple Access (CDMA), Time Division Multiple Access (TDMA), Orthogonal Frequency Division Multiplexing (OFDM), and variants thereof.

Communications to/from base station 102 and radio 104 can take place using secure communications. As described, security is made possible by processors 120 sharing a traffic encryption key (TEK) that uniquely specifies an encryption algorithm for the communication between devices 102 and 104. All communications between devices are encrypted and decrypted with the TEK.

As described above, the process of loading TEKs into the radio 104 can be accomplished in a variety of ways. Although only Over-The-Air Rekeying (OTAR) will be addressed below, it should be noted that rekeying may be accomplished via a KVL, or store and forward technique in a similar manner.

During operation Project 25 Key Management Messages (KMMs) are used to conduct key management operations, including rekeying, between KMF 106 and radio 104. Message integrity and source authentication of the KMMs is provided by a Message Authentication Code (MAC).

The MAC is a short piece of information that is used to authenticate a message. The MAC is shared among radio 104, and KMF 106. In this manner, both radio 104 and KMF 106 will utilize the same MAC. During Project 25 KMM transaction, the recipient device (e.g., KMF 106) uses the MAC embedded within the KMM to authenticate the KMM that was sent by the originating device (e.g., radio 104).

Successful authentication of the KMM verifies the message's origin and integrity. In a Project 25 KMM transaction, the originating device can be KMF 106 with the recipient device being radio 104, or the originating device can be the radio 104 with the recipient device being KMF 106. The algorithm used to verify the KMM (MAC algorithm) uses an arbitrary length KMM and a shared key (shared between the originating and recipient device) as inputs, and generates a fixed-length MAC as an output. The MAC is generated by using a shared private key (shared among the originator and the recipient of the KMM). The shared private key and a cryptographic algorithm are used on the KMM to generate the MAC. The originating device then appends the calculated MAC to the KMM prior to its transmission.

Upon receiving the KMM, the recipient device performs the same MAC algorithm that was used by the originating device. In other words, the shared key is used along with the KMM to generate a MAC. The recipient device determines whether the MAC value that it calculates matches to the MAC value that was appended to the KMM. A match implies that the originating device possesses the same shared key as the recipient device, and thus validates the authenticity of the KMM's.

The manner in which the MAC is embedded within the KMM is shown in FIGS. 2, 3 and 4. FIG. 2 shows the general format of a KMM. There is a MAC control field in Octet 3 that indicates the type of MAC algorithm that is used, and can also indicate when no MAC is used. The last set of octets in the KMM include the MAC value. The length of the MAC value depends on the type of MAC algorithm being used. FIG. 3 expands the detail of the last set of octets in the KMM that are used for the MAC. The last octet of the MAC field includes control information; the T flag indicates if Type 1 or Type 3 encryption is used with the MAC calculation, the D flag indicates whether the shared key is the same as the traffic encryption key or derived from the traffic encryption key, and the Version field indicates the version number of the MAC field format. FIG. 4 expands the detail of the MAC Message Body portion of FIG. 3. The MAC value is included in the first set of octets, followed by the length of the MAC value, the Algorithm ID of the MAC algorithm and the Key ID of the shared MAC key.

As discussed above, there are some situations where radio 104 may not currently have a TEK or is unable to generate a MAC, but still needs to conduct key management operations with the KMF in order to rekey radio 104. In order to address this issue, a method and apparatus for authenticating a key management message within a secure communication system is provided. In scenarios where there is no available symmetric key to use for generating the MAC, a digital signature will be utilized to authenticate the KMM. MACs differ from digital signatures in that the message originator and message recipient must use the same shared key to generate the MAC. Digital signatures are a function of public key cryptography, where the message originator and message recipient use different keys that are mathematically related to each other.

A digital signature provides a way to ensure that the creator of the data is known (authentic), and the integrity of the data is ensured. Digital signatures are a form of public-key cryptography which ensures integrity and authenticity. Public-key cryptography uses two keys that are mathematically related to each other—a private key and a public key. A device's private key is not known to any entity other than the device itself. A device's public key is known by other entities of which the device normally communicates with. The public key is typically published within the digital certificate format. Creating a digital signature (known as signing) takes a private key and data to form the digital signature. The verification process takes the data, the corresponding public key, and produces a yes/no answer on whether the private key was used to create the signature. When the answer is 'yes', authenticity and integrity are proven for that data.

Thus, in accordance with an embodiment of the present invention, any KMM generated by base station 102 or radio 104 will be signed with a digital signature when a MAC is unavailable. Memory 118 will be utilized by KMF 106 and radio 104 to store public and private keys used for authenticating the KMM.

Since APCO 25 KMMs are transmitted on narrowband channels, the sizes of the messages are an important consideration. As a result, elliptic curve cryptography appears to be a good fit for the KMM signatures, since the signature sizes are significantly more modest than those for other public key crypto, such as RSA and DSA. Project 25 may use either the P-256 or P-384 curves, with signature sizes of 64 octets or 96 octets, respectively.

The Message Format field in Octet 3 of FIG. 2 will have to indicate that a digital signature is being used for message authentication, in place of the MAC. There are a number of embodiments for accomplishing this. One example is shown in FIG. 5, where a new S-flag indicates whether or not a digital signature is used. If a signature is used (S=1), then no MAC is used, so MN=00. The S-flag used one of the spare bits that were defined in FIG. 2. With this embodiment, there isn't a need to reuse the MAC Format field that's shown in FIG. 3. A Digital Signature Body Format will be defined, as shown in FIG. 6. The Algorithm ID will indicate the public key signing algorithm being used. The Key ID will reference the public key to be used for validating the signature.

FIG. 7 is a flow chart showing operation of a receiving device that receives a KMM and authenticates the KMM. The logic flow begins at step 701 wherein logic circuitry receives a KMM. As discussed above, the KMM may contain a Transmit Encryption Key (TEK). The KMM may be received in response to a rekeying request (i.e., a request for a TEK) sent by the receiving device, and the received TEK may be used to encrypt all over-the-air communications transmitted and received by the receiving device.

As described above, TEK may be received via an over-the-air KMM used for rekeying a device. At step 703 the logic circuitry determines if a MAC is available as part of the received KMM. As discussed, the MAC is a shared secret between a transmitting device and a receiving device. If at step 703 it is determined that the MAC is available, the logic flow continues to step 705 where the MAC is used to authenticate the KMM.

As discussed above, the process of authenticating the KMM using the MAC comprises using a key shared between the originator of the KMM and the recipient of the KMM. A shared key and a MAC algorithm are used on the KMM to produce the MAC. If the generated MAC matches the received MAC, the KMM is authenticated.

Returning to step 703; if it is determined that a MAC is unavailable as part of the received KMM, then the logic flow continues to step 707 where the digital signature is used to authenticate the KMM by using a public key and a cryptographic algorithm on the KMM to authenticate the KMM. The originator of the KMM uses a private key, a cryptographic algorithm, and the KMM to generate the digital signature. The signature is verified by the logic circuitry by using the originator's public key on the KMM to generate a digital signature. If the generated digital signature matches the digital signature received with the KMM, then the KMM is authenticated.

It should be noted that the MAC differs from the digital signature in that a message originator and message recipient must use a same shared key to generate the MAC, wherein the message originator and message recipient use different keys that are mathematically related to each other to generate the digital signature.

Figure 8:
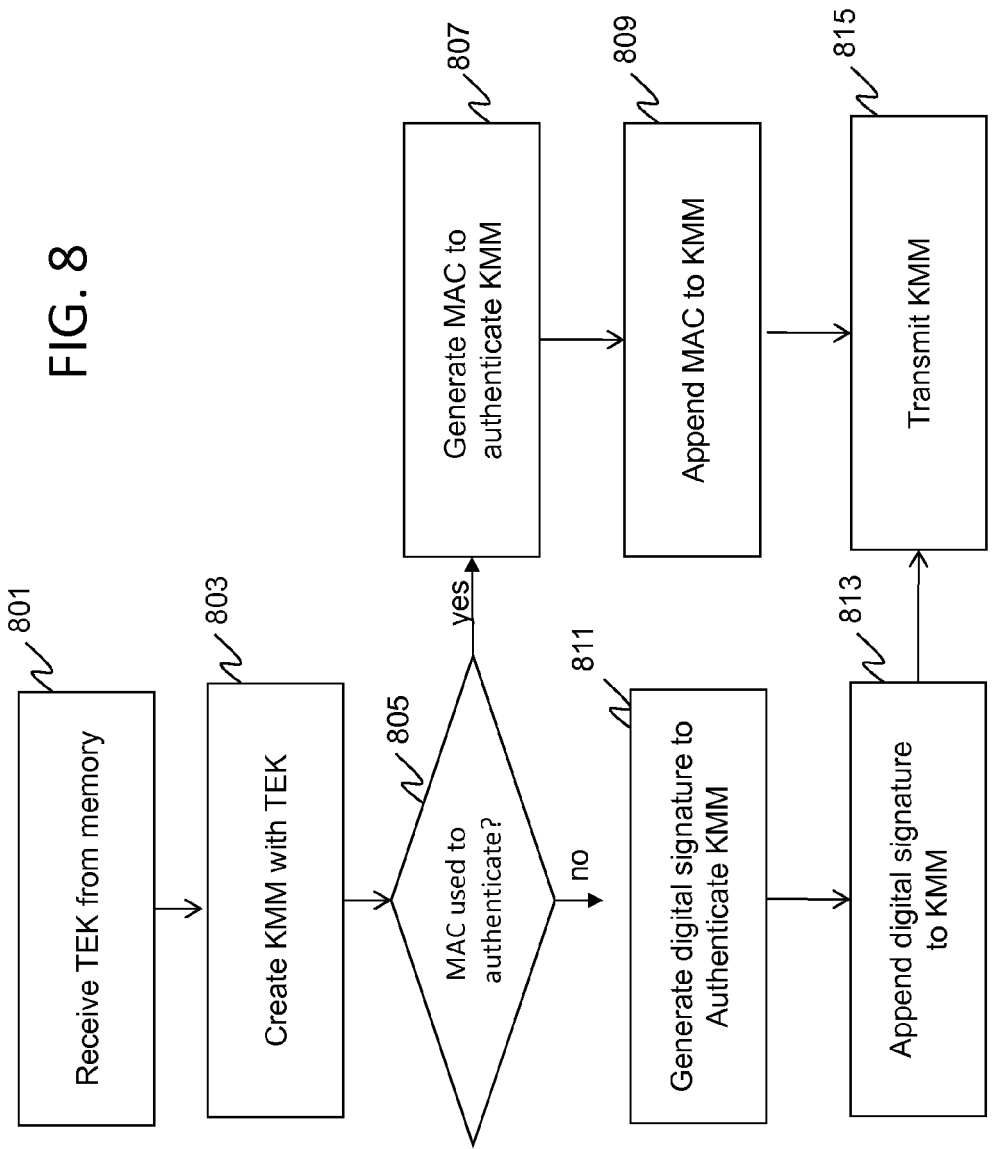
FIG. 8 is a flow chart showing operation of a transmitting device that transmits a KMM with a digital signature or a MAC.

FIG. 8 is a flow chart showing operation of a transmitting device that transmits a KMM with a digital signature or a MAC. In FIG. 8, the description is given with a KMM containing a TEK, however, one of ordinary skill in the art will recognize that the KMM need not contain a TEK. The KMM may be created in response to a received over-the-air request for the TEK.

The logic flow begins at step 801 where logic circuitry retrieves a TEK from memory. A KMM is then created with the TEK (step 803). In order to allow the KMM to be properly authenticated, logic circuitry determines if a MAC will be used by a receiving device to authenticate the KMM (step 805). If so, the logic circuitry continues to step 807 where a shared key and a cryptographic algorithm is used on the KMM to generate the MAC, and the MAC is appended to the KMM (step 809). If, however, a MAC will not be used to authenticate the KMM, then the logic flow continues to step 811. At step 811, a private key and a cryptographic algorithm are used on the KMM to generate a digital signature, and the digital signature is appended to the KMM (step 813). Finally, at step 815, the KMM is transmitted via a transmitter with either the MAC or the digital signature. The KMM may be transmitted as part of an over-the-air message. The TEK may then be used to encrypt over-the-air communications.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for authenticating a Key Management Message (KMM) within a secure communication system, the method comprising the steps of:
    receiving the KMM;
    determining if a Message Authentication Code (MAC) is available as part of the KMM;
    using the MAC to authenticate the KMM when the MAC is available;

using a public-key cryptography digital signature to authenticate the KMM when the MAC is unavailable;

wherein the MAC differs from the digital signature in that a message originator and message recipient must use a same shared key to generate the MAC, wherein the message originator and message recipient use different keys that are mathematically related to each other to generate the digital signature.

2. The method of claim 1 wherein the step of receiving the KMM comprises the step of receiving the KMM containing a transmit encryption key (TEK).

3. The method of claim 2 further comprising the step of: using the TEK to encrypt over-the-air communications.

4. The method of claim 2 wherein the step of receiving the KMM comprises the step of receiving the KMM via over-the-air communication in response to a request for a transmit encryption key (TEK).

5. The method of claim 1 wherein the step of using the MAC to authenticate the KMM comprises the step of using a shared key and a MAC algorithm on the KMM to produce the MAC.

6. The method of claim 5 wherein the step of using the digital signature to authenticate the KMM comprises the step of using a public key and a cryptographic algorithm on the KMM to authenticate the KMM.

7. The method of claim 1 wherein the MAC is shared secret between a transmitting device and a receiving device.

8. A method for transmitting a Key Management Message (KMM) within a secure communication system, the method comprising the steps of:

creating a KMM;

determining if a Message Authentication Code (MAC) is going to be used by a receiving device to authenticate the KMM;

using a shared key and a cryptographic algorithm on the KMM to generate a MAC when the MAC is going to be used to authenticate the KMM;

using a private-key and a cryptographic algorithm on the KMM to generate a digital signature when the MAC is not going to be used to authenticate the KMM; and transmitting the KMM with either the MAC or the digital signature;

wherein the MAC differs from the digital signature in that a message originator and message recipient must use a same shared key to generate the MAC, wherein the message originator and message recipient use different keys that are mathematically related to each other to generate the digital signature.

9. The method of claim 8 wherein the step of creating a KMM comprises the step of creating the KMM containing a transmit encryption key (TEK).

10. The method of claim 8 further comprising the step of: receiving an over-the-air request for a transmit encryption key (TEK); and wherein the step of creating the KMM comprises the step of creating the KMM containing the transmit encryption key (TEK).

11. The method of claim 8 wherein the step of transmitting the KMM comprises the step of transmitting the KMM via an over-the-air message.

12. The method of claim 8 further comprising the step of: using the TEK to encrypt over-the-air communications.

13. An apparatus for authenticating a Key Management Message (KMM) within a secure communication system, the apparatus comprising:

a transceiver receiving the KMM;

logic circuitry determining if a Message Authentication Code (MAC) is available as part of the KMM, using the MAC to authenticate the KMM when the MAC is available, and using a public-key cryptography digital signature to authenticate the KMM when the MAC is unavailable;

wherein the MAC differs from the digital signature in that a message originator and message recipient must use a same shared key to generate the MAC, wherein the message originator and message recipient use different keys that are mathematically related to each other to generate the digital signature.

14. The apparatus of claim 13 wherein the KMM contains a transmit encryption key (TEK).

15. The apparatus of claim 14, wherein the logic circuitry uses the TEK to encrypt over-the-air communications.

16. The apparatus of claim 13 wherein the MAC is shared secret between a transmitting device and a receiving device.

* * * * *

UNITED STATES PATENT AND TRADEMARK OFFICE
CERTIFICATE OF CORRECTION

| | |
|---|---|
| PATENT NO. | : 8,650,404 B2 |
| APPLICATION NO. | : 13/406610 |
| DATED | : February 11, 2014 |
| INVENTOR(S) | : Senese et al. |

It is certified that error appears in the above-identified patent and that said Letters Patent is hereby corrected as shown below:

In The Specification

In Column 3, Line 6, delete "Turing" and insert -- Turning --, therefor.

In Column 3, Line 14, delete "106." and insert -- 106). --, therefor.

Signed and Sealed this
Tenth Day of May, 2016

Michelle K. Lee
*Director of the United States Patent and Trademark Office*